(12) United States Patent
Gutzer

(10) Patent No.: US 9,115,640 B2
(45) Date of Patent: Aug. 25, 2015

(54) INTERNAL COMBUSTION ENGINE WITH A FIRST AND A SECOND INJECTER

(71) Applicant: Bayerische Motoren Werke Aktiengesellschaft, Munich (DE)

(72) Inventor: Ulrich Gutzer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/574,484

(22) Filed: Dec. 18, 2014

(65) Prior Publication Data

US 2015/0101565 A1 Apr. 16, 2015

Related U.S. Application Data

(63) Continuation of application No. PCT/EP2013/064871, filed on Jul. 15, 2013.

(30) Foreign Application Priority Data

Aug. 10, 2012 (DE) .................. 10 2012 214 261

(51) Int. Cl.
*F02D 41/40* (2006.01)
*F02B 23/10* (2006.01)
(Continued)

(52) U.S. Cl.
CPC ............. *F02B 23/104* (2013.01); *F02B 23/101* (2013.01); *F02D 7/00* (2013.01); *F02D 41/402* (2013.01); *F02D 2041/389* (2013.01); *F02D 2041/3881* (2013.01)

(58) Field of Classification Search
CPC .......... F02D 41/402; F02D 2041/3881; F02D 2041/389; F02M 45/086; F02M 43/04
USPC ........................... 123/299, 300, 305, 575–579
See application file for complete search history.

(56) References Cited

U.S. PATENT DOCUMENTS 7,461,628 B2 12/2008 Blumberg et al.
7,721,703 B2 * 5/2010 Kakuho et al. ................ 123/304
(Continued)

FOREIGN PATENT DOCUMENTS

DE 10 2004 034 505 A1 2/2006
DE 10 2006 014 071 B3 10/2007
DE 10 2008 044 243 A1 6/2010

OTHER PUBLICATIONS

International Search Report dated Sep. 26, 2013 with English translation (five (5) pages).

(Continued)

*Primary Examiner* — Erick Solis
(74) *Attorney, Agent, or Firm* — Crowell & Moring LLP

(57) ABSTRACT

An internal combustion engine includes a first injector and a second injector for injecting fuel directly into a combustion chamber in a cylinder in a crank case of the internal combustion engine. The combustion chamber is delimited at one side by a piston which is arranged in the cylinder so as to carry out a stroke and at the other side by a cylinder head. At least one gas exchange inlet valve and a gas exchange outlet valve are provided in the cylinder head for a charge exchange. The first injector is largely oriented in the direction of a cylinder axis, and the second injector is oriented at an angle to the cylinder axis. Maximally 80% of a full-load fuel quantity required by the internal combustion engine for a full load can be introduced into the cylinder using the first injector and maximally 50% using the second injector. The injectors can be configured for smaller fuel flow rates using the internal combustion engine design and operating method, whereby the precision of the injection is improved.

11 Claims, 1 Drawing Sheet

(51) Int. Cl.
*F02D 7/00* (2006.01)
*F02D 41/38* (2006.01)

(56) References Cited

U.S. PATENT DOCUMENTS

| | | | |
|---|---|---|---|
| 2002/0020388 A1* | 2/2002 | Wright et al. | 123/304 |
| 2007/0144480 A1 | 6/2007 | Herweg et al. | |
| 2008/0127933 A1* | 6/2008 | Blumberg et al. | 123/304 |
| 2009/0308367 A1* | 12/2009 | Glugla | 123/575 |
| 2010/0147261 A1 | 6/2010 | Yamaguchi et al. | |

OTHER PUBLICATIONS

German Search Report dated Dec. 17, 2012, including English translation (ten (10) pages).

* cited by examiner

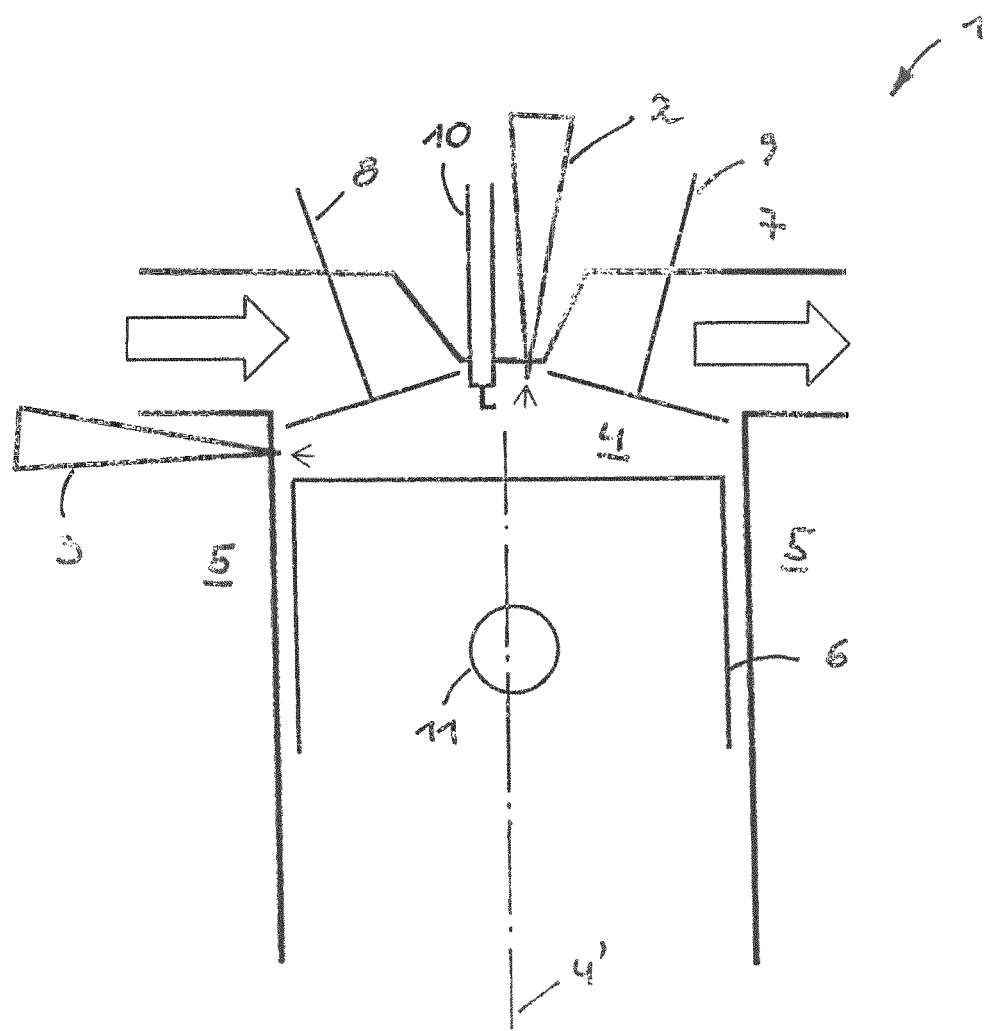

INTERNAL COMBUSTION ENGINE WITH A FIRST AND A SECOND INJECTER

CROSS REFERENCE TO RELATED APPLICATIONS

This application is a continuation of PCT International Application No. PCT/EP2013/064871, filed Jul. 15, 2013, which claims priority under 35 U.S.C. §119 from German Patent Application No. 10 2012 214 261.4, filed Aug. 10, 2012, the entire disclosures of which are herein expressly incorporated by reference.

BACKGROUND AND SUMMARY OF THE INVENTION

The invention relates to an internal combustion engine with a first and a second injector for injecting fuel directly into a combustion chamber in a cylinder in a crankcase of the internal combustion engine and to a method for operating the internal combustion engine.

The variation of the injection quantity of a direct-injection fuel injector from the minimum to the maximum load on the internal combustion engine, the variation being engine-speed and load dependent as is required, impairs precise control of small and very small fuel injection quantities. The maximum fuel quantity required likewise determines the size or diameter of the injection holes in the injector tip and compromises the achievable droplet spectra (shifting of the droplet diameter in the direction of larger droplets) at small and very small loads on the internal combustion engine. Moreover, the large droplets lead to a large penetration depth of the fuel jet into the combustion chamber and to wetting of other components in the combustion chamber. As a result of these factors, the fuel pressure must be increased, with disadvantages in terms of outlay on construction and friction. Moreover, not all of the problems mentioned can be fully solved with the conventional increase in fuel pressure.

The use of another method of supplying fuel mitigates both problems. The use of intake manifold injection, for example, is known in this context. The disadvantage here is the lack of internal cooling of the combustion chamber by the directly injected fuel, resulting in a reduction in compression.

To improve mixture preparation of an internal combustion engine, German patent application DE 10 2004 034 505 A1 discloses, for example, the use of two fuel injectors for injecting the fuel. DE 10 2004 034 505 A1 proposes inserting a fuel injector into the intake pipe and using a fuel injector for direct injection of the fuel into the combustion chamber.

German Patent DE 10 2006 014 071 B3, which the present invention considers a starting point, furthermore discloses a combustion method for an internal combustion engine in which fuel is injected directly into the combustion chamber by one or more injection devices. Here, the injection process is divided into at least two partial injections, which take place in different areas of the combustion chamber. In DE 10 2006 014 071 B3, it is proposed that a pilot injection be directed into central areas and a main injection into outer areas of the combustion chamber, with free spatial arrangement of the injection jets.

Even if this prior art does not have any disadvantages in principle, it is the underlying object of the present invention to improve the metering accuracy of fuel for an internal combustion engine of the type in question.

This and other objects are achieved by providing an internal combustion engine, and method of operating same, with a first injector and a second injector for injecting fuel directly into a combustion chamber in a cylinder in a crankcase of the internal combustion engine. The combustion chamber is delimited on one side by a piston arranged in the cylinder in such a way that it can perform a stroke motion and on the other side by a cylinder head. At least one gas exchange inlet valve and one gas exchange outlet valve are provided in the cylinder head for a charge exchange, wherein the first injector is arranged so as to be largely oriented in the direction of a cylinder axis, and the second injector is arranged so as to be oriented at an angle to the cylinder axis. A maximum of 80% of a full-load fuel quantity required by the internal combustion engine for a full load can be introduced into the cylinder using the first injector and a maximum of 50% of said quantity can be introduced using the second injector.

In addition to the solution of the above-mentioned problems, there is further functional potential through appropriate configuration of the fuel injection quantities of the individual injectors and, if appropriate, of other mixture preparation characteristics, e.g. modifying the jet pattern, provision of the minimum quantity of fuel, specialization on a particular load range of the internal combustion engine. Owing to the capacity, according to the invention, for adapting the fuel flow rate through the injector, the internal friction in the high-pressure pump can be reduced, especially at low loads on the internal combustion engine.

In a preferred embodiment, the first and the second injectors can be operated simultaneously and/or with a timed offset. This allows further adaption to different operating states of the internal combustion engine.

In a preferred method of operating the internal combustion engine, the fuel injection of an idling fuel quantity is performed only with the first injector when the internal combustion engine is idling.

In a further preferred embodiment, the fuel injection of a fuel quantity for catalyst heating is performed only with the first injector during catalyst heating.

It is further advantageous to have fuel injection of between 50% and 90% of a part-load fuel quantity performed with the first injector and between 10% and 50% of the quantity performed with the second injector during a part load on the internal combustion engine. It is also preferred to have fuel injection of between 50% and 80% of a full-load fuel quantity performed with the first injector and between 20% and 50% of the quantity be performed with the second injector during a full load on the internal combustion engine.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic diagram of a reciprocating piston internal combustion engine according to one embodiment of the invention with a first and a second injector.

DETAILED DESCRIPTION OF THE DRAWINGS

FIG. 1 shows schematically a reciprocating piston internal combustion engine 1 with a first injector 2 and a second injector 3 for injecting fuel directly into a cylinder 4 in a crankcase 5 of the internal combustion engine 1. Of course, the invention can also be employed in rotary piston internal combustion engines and in two- or four-stroke reciprocating piston internal combustion engines, for example.

A combustion chamber is delimited on one side by a piston 6 arranged in the cylinder 4 in such a way that it can perform a stroke motion and on the other side by a cylinder head 7. Furthermore, the cylinder head 7 has at least one gas exchange inlet valve 8 and one gas exchange outlet valve 9 for a charge exchange. While the first injector 2 is arranged so as to be largely oriented in the direction of a cylinder axis 4', the second injector 3 is arranged so as to be oriented at an angle to the cylinder axis 4'. The second injector 3 can be arranged either in the cylinder head 7 or in the cylinder 4.

A charge exchange direction is indicated schematically by two arrows in undesignated charge exchange ducts, an ignition device is denoted by 10 and a piston pin in the piston 6 is denoted by 11.

According to the invention, a maximum of 80% of a full-load fuel quantity required by the internal combustion engine 1 for a full load can be introduced into the cylinder 4 using the first injector 2 and a maximum of 50% of said quantity can be introduced using the second injector 3.

The first and the second injector 2, 3 can preferably be operated simultaneously and/or with a time offset.

By means of this internal combustion engine, embodied in accordance with the invention, having a first and a second injector 2, 3, the following methods can then be carried out:

1. that fuel injection of an idling fuel quantity is performed only with the first injector 2 when the internal combustion engine 1 is idling;
2. that fuel injection of a fuel quantity for catalyst heating is performed only with the first injector 2 during catalyst heating;
3. that fuel injection of between 50% and 90% of a part-load fuel quantity is performed with the first injector 2 and of between 10% and 50% of said quantity is performed with the second injector 3 during a part load on the internal combustion engine 1; and
4. that fuel injection of between 50% and 80% of a full-load fuel quantity is performed with the first injector 2 and of between 20% and 50% of said quantity is performed with the second injector 3 during a full load on the internal combustion engine 1.

The term "idling fuel quantity" is understood to mean the fuel quantity which the internal combustion engine 1 requires for idling.

The term "fuel quantity for catalyst heating" is understood to mean the fuel quantity which the internal combustion engine 1 requires during a catalyst heating phase. In this case, fuel injection takes place relatively late in time, with the result that unburned hydrocarbons are discharged into the exhaust duct in order to heat the catalyst.

The term "part-load fuel quantity" is understood to mean the fuel quantity which the internal combustion engine 1 requires during a part load. This varies from one internal combustion engine to another and is dependent on the temperature, the engine speed and the load demanded.

The term "full-load fuel quantity" is understood to mean the fuel quantity which the internal combustion engine requires in the full-load range.

List of reference signs:
1. internal combustion engine
2. first injector
3. second injector
4. cylinder
4' cylinder axis
5. crankcase
6. piston
7. cylinder head
8. gas exchange inlet valve
9. gas exchange outlet valve
10. ignition device
11. piston pin The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An internal combustion engine, comprising:
   a cylinder in a crank case of the internal combustion engine;
   a combustion chamber in the cylinder, the combustion chamber being delimited on one side by a piston arranged in the cylinder that performs a stroke motion and on another side by a cylinder head;
   at least one gas exchange inlet valve and one gas exchange outlet valve provided in the cylinder head for a charge exchange;
   first and second injectors configured to inject fuel directly into the combustion chamber in the cylinder, wherein
   the first injector is arranged oriented largely in a direction of a cylinder axis of the cylinder, and the second injector is arranged oriented at an angle to the cylinder axis, and
   a maximum of 80% of a full-load fuel quantity required by the internal combustion engine for a full load is introducible into the cylinder via the first injector and a maximum of 50% of said full-load fuel quantity is introducible via the second injector.

2. The internal combustion engine according to claim 1, wherein the first and second injectors are operated simultaneously.

3. The internal combustion engine according to claim 2, wherein the first and second injectors are operated with a time offset.

4. The internal combustion engine according to claim 1, wherein the first and second injectors are operated with a time offset.

5. A method of operating an internal combustion engine equipped with a cylinder in a crank case of the internal combustion engine, a combustion chamber in the cylinder, the combustion chamber being delimited on one side by a piston arranged in the cylinder and on another side by a cylinder head, at least one gas exchange inlet valve and one gas exchange outlet valve provided in the cylinder head, and first and second injectors configured to inject fuel directly into the combustion chamber in the cylinder, the method comprising the acts of:
   under a full load, introducing a maximum of 80% of a full-load fuel quantity required by the internal combustion engine into the cylinder via the first injector, which first injector is oriented largely in a direction of the cylinder axis; and
   under the full load, introducing a maximum of 50% of the full-load fuel quantity required by the internal combustion engine via the second injector, which second injector is oriented at an angle to the cylinder axis.

6. The method according to claim 5, wherein the acts of introducing the fuel quantity are carried out simultaneously by the first and second injectors.

7. The method according to claim 5, wherein the acts of introducing the fuel quantity are carried out in a time offset manner via the first and second injectors.

8. The method according to claim 5, further comprising the act of:
   under idling, introducing an idling fuel quantity only via the first injector when the internal combustion engine is idling.

9. The method according to claim 5, further comprising the act of:
   under a catalyst heating, introducing a fuel quantity for catalyst heating only via the first injector during catalyst heating.

10. The method according to claim 5, further comprising the act of:
    under a part-load, introducing between 50% and 90% of a part-load fuel quantity via the first injector, and introducing between 10% and 50% of said part-load fuel quantity via the second injector during the part load on the internal combustion engine.

11. The method according to claim 5, further comprising the act of:
    under a full-load, introducing between 50% and 80% of the full-load fuel quantity with the first injector, and introducing between 20% and 50% with the second injector.

* * * * *